March 14, 1967   J. P. KARCHER ETAL   3,308,578
HUMIC ACID HEAT SINK
Filed July 19, 1965

INVENTORS
JOHN P. KARCHER
LYNN P. PITTARD

ATTORNEY

United States Patent Office 3,308,578
Patented Mar. 14, 1967

3,308,578
HUMIC ACID HEAT SINK
John P. Karcher, 505 First National Bank Bldg., Midland, Tex. 79701, and Lynn P. Pittard, 201 Sunset, Hereford, Tex. 79045
Filed July 19, 1965, Ser. No. 472,789
5 Claims. (Cl. 47—9)

This invention relates to the stimulation of emergence of agricultural crops, and more particularly, to the economical establishment over a seed bed of a heat sink to accelerate germination. In a more specific aspect, the invention relates to the installation and fixation to the exposed surface of a seed bed of a heat-absorbent coating of alkaline humate salts.

In accordance with the prior art, it has been the practice to form heat-absorbent layers over seed beds either totally to cover a given area or to cover only narrow strips directly over a seed bed. It has been generally recognized that, where accelerated germination of a crop will provide a few days or an extra week in growing seasons terminated by a first frost, such additional growing time results in a substantial increase in crop yield. The performance of cotton in this regard is well recognized. Further, vegetables which make an early appearance on the market command higher prices than when the havest is at its peak. Thus, in both instances, acceleration of germination is justified economically. Various types of coating materials have been employed in the prior art, from sheet materials to asphalt emulsions, carbon black and the like. It is further known to introduce soluble salts of humic acid into the seed beds as soil conditioners or plant stimulants.

The present invention is directed to the use of humate salts of black color and physical properties which permit them to establish a heat-absorbent layer in the surface portion of the seed bed which is stable as to maintain its integrity at least through the period of germination of the seeds involved. The introduction of alkaline humate salts onto the seed bed, rather than having long-term undersirable effects such as characterize many materials used prior hereto, has the advantage of enhancing the physical characteristics of the soil. Particularly is this true in the case of clayey soils, were the presence of humate salts serves structurally to modify the seed bed merely by the presence of the humate salts. Clayey soil, with humate salts present, is more friable than without humate salts. In contrast, the use of asphalt materials over a long period of time may change the productive capabilities of the soil.

In general, humic acid and humate salts have been said to include all those fractions of organic matter and its decay, the alkaline (ammonia, potassium and sodium) salts of which are water dispersible and are commonly considered to be soluble in water. Humic acid and humate salts, as those terms are used herein, refer specifically to those fractions of humic acid which are dispersible in an alkaline solution, but excludes those fractions that are also soluble in acid, alcohol, Ketone and other solvents. An alkaline solution, for the purpose of this description, will be a solution having a pH of 6.5 or greater.

Humic acid or the salts thereof may be found in quantity in leonardite and may be extracted by the alkaline solution process. Refining techniques for the manufacture of humates are not of concern to the present invention. Humic acid and humate salts, as defined above, can be synthesized from coal by means of reducing the same with a suitable acid such as nitric acid.

In accordance with the present invention, there is provided a method of accelerating germination of plants in a seed bed. The method involves covering, at least in strips, the surface of the seed bed with a layer of humate salts in the amount of between 25 and 500 pounds of such salts per acre and forming said salts into a stable surface layer of heat-absorbing characteristics.

Preferably, in accordance with the invention, a humate salt of pH at least 6.5 is mixed with water and sprayed along the course of the seed bed. By adherence of the humate salts to the surface soil particles, a stable surface layer is formed as the water is lost to the soil and/or to the atmosphere.

Further in accordance with the invention, a seed bed coating solution is provided in which pulverized leonardite ore is mixed with water and alkali in amount of at least about 10% ore by weight, the resulting solution having a pH of at least 6.5.

For a more complete understanding of the present invention and for further objects and advantages thereof, reference may now be had to the following description taken in conjunction with the accompanying drawings in which.

Figure 1:
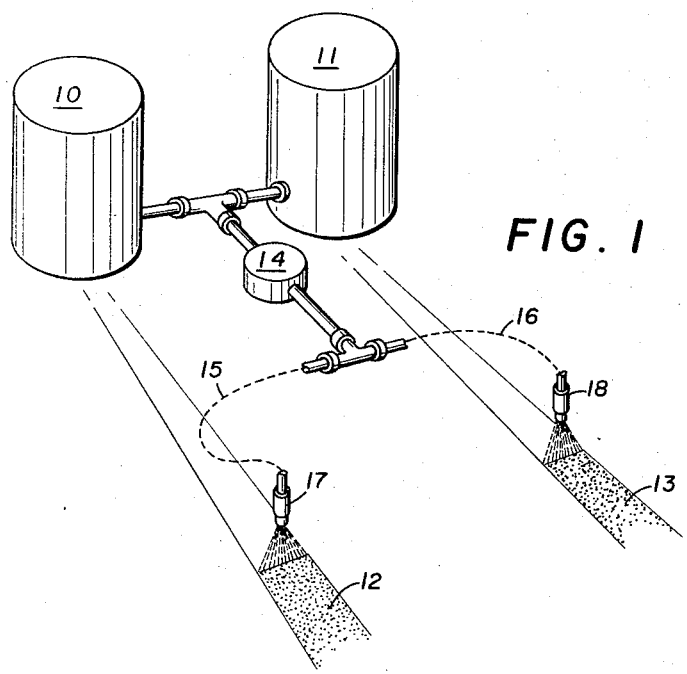
FIGURE 1 illustrates one embodiment of a system for carrying out the present invention.

In FIGURE 1, application of a surface layer is illustrated, in accordance with the present invention, wherein tanks 10 and 11 are supported on a suitable farm vehicle (not shown) to apply black heat-absorbent surface strips 12 and 13 over the seed beds immediately behind a planter. While neither the planter nor the vehicle itself have been illustrated in FIGURE 1, it will be understood that an aqueous solution of humate salts is delivered from tanks 10 and 11 by way of a pump 14 and lines 15 and 16 to nozzles 17 and 18, respectively. The spray forms a surface cover over the seed bed immediately following the placement of the seeds. In the preferred embodiment of the invention, the humate salts will be applied to the seed bed as strips of, for example, eight inches wide on beds of forty-inch centers, in amounts of between 25 and 500 pounds per acre. With such planting, about 13,068 linear feet of eight-inch heat-absorbing strips would be laid down on each acre. The amount of humate salts employed is based on the dry weight of the salts, and would be in amounts of from 0.0027 pound per square foot to 0.0575 pound per square foot. Preferably, the humate salts would be used at a rate of about 0.0115 pound per square foot.

The solution will have concentrations of humate salts therein such that the percent by weight of humate salts in the solution preferably will be of the order of about 10% to 13%. The amounts used will depend to a degree upon the pH of the final solution. Where the humate salt fraction of the solids in the solution is as low as 6% by weight with a pH of about 6.5 or above, the solution when sprayed onto the soil does not readily form a suitable surface coating. In contrast, solutions having concentrations of 10% to 13% have been found to be satisfactory. Where additives, as hereafter described, are employed, low humate soil concentrations may be useful.

With high concentrations in simple water-humate salt solutions, i.e., about 15% humate salts, it has been found that the solution is so thick as to make it difficult to handle and thus the foregoing range has been found to be preferable, but it may be changed in the case of additives which will modify the physical character of the solution to facilitate handling at concentrations outtside the above preferred range.

In accordance with a preferred mode of application, and in accordance with the system illustrated in FIGURE 1, humate salts having a pH of between 7 and 8 would constitute between 11% and 12% of the total weight of the solution, which solution is applied in quantities of about 100 pounds of humate salts per acre.

Figure 2:
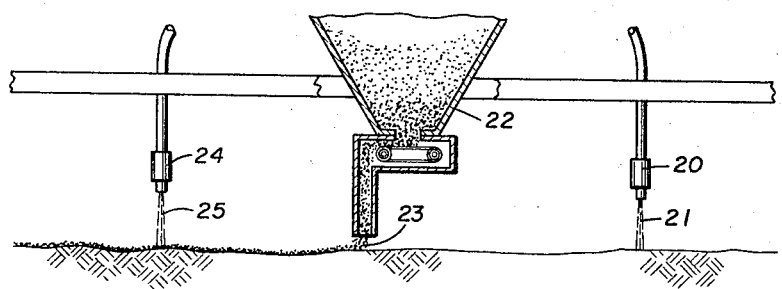
FIGURE 2 illustrates the installation of a heat-absorbent layer employing dry humate salts.

In FIGURE 2, an alternative mode of applying humate salts as a seed bed coating is illustrated. A spray unit 20 is moved along and above the seed bed to apply a water spray 21 to wet the surface of the seed bed. A spreader 22 of dry powder humate salts is moved behind the spray unit 20 to deposit a layer 23 onto the moist surface. A second spray unit 24 follows the spreader 22 and applies a water spray 25 to the powdered humate salts 23 to wet the same and to cause the humate salts to be fixed to the soil, thereby to form with the surface particles a film or crust which will withstand wind erosion and which, to a degree, will maintain its heat-absorbent qualities in the presence of precipitation.

As above noted, alkaline salts of humic acid are commonly termed "soluble." Actually, they are dispersible. Such alkaline (nominally pH 6.5 and above) salts actually are colloids and behave as such in water, rather than being truly "soluble." Because of their extremely dark color, such salts, when properly applied, will absorb substantial amounts of solar radiation and transmit the heat to the soil below, thereby creating higher and therefore more optimum temperatures in the soil at the seed location. Because of their colloidal behavior, the salts bond onto soil particles, forming a thin film around each such particle, and thus appear to dye them black. With the resulting black color, the surface layer is heat absorbing.

Figure 3:
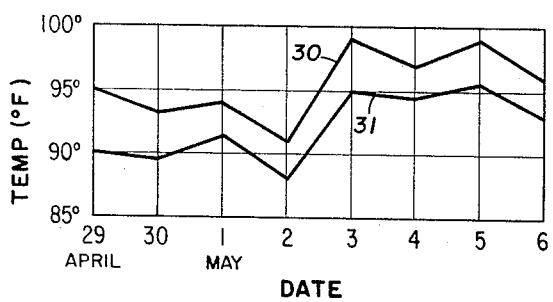
FIGURE 3 is a graph showing the results of use of the present invention.

In FIGURE 3, the temperature of the soil at a two-inch depth is shown in curve 30 for a seed bed over which a strip of humate salts has been formed and in curve 31 for a similar seed bed which does not have a surface covering. Curves 30 and 31 illustrate the temperature at the same time on each of eight successive days. The measurements were made at 2:00 p.m. on successive days at the last of April and first of May in northwest Texas. Each set of measurements clearly shows the soil temperature under the surface layer to be higher, by about 5° F., than the soil temperature where no heat-absorbent layer is present. This illustrates the increase in heat absorption of the seed bed provided with the humate salt strip, and thus is indicative of the potential beneficial effects upon seeds during the germination period.

While ammonium humate, of the type described in U.S. Patent No. 3,111,404 to Karcher, may be suitable for use in forming the surface strips in accordance with the present invention, the materials employed may be more primitive. A solution may be formed by pulverizing a relatively high grade leonardite ore. Preferably, the particle size should not exceed about 40 mesh. The pH of the ore is then raised by treating in an alkaline solution of such strength and for such a period of time that the pulverizing ore will have a pH of at least 6.5. Thus, the additional steps of crushing, ammoniating and drying, described in said Karcher patent, would be employed when producing a powdered humate salt which could be later mixed with water to form a spray solution.

Further, to enhance the effective life of the absorbent layer, it has been found that a carrier solution comprising an oil-in-water emulsion is helpful. Use of such emulsion increases the stability and will permit the heat-absorbent layer to withstand precipitation better than without the use of oil. By way of example, oil was emulsified in amounts of from 15% to 30% in water to which a humate salt was added in amounts of about 10% by weight. Because of the colloidal properties, the humate salts acted as an emulsion-stabilizing agent.

Alternatively, the crushed leonardite ore would be mixed in an $NH_4OH$ solution and water of proportions to maintain the pH at about 7 or 8 until the ore is dispersed in the solution. The solution may then be used as a spray. Sodium salts of humates may also be used for some soils. However, as is well known, the sodium salts, including sodium humate, should not be used in some areas.

It has further been found that other additives may be employed in the solution as it is used for spraying the seed bed surface. It has been found that the addition of starches to the solution serves to enhance the life of the heat-absorbent layer. The addition of starch in amounts up to about 2% of the weight of the humate salts has been employed successfully. Various types of starches may be employed in such small amounts, but with substantially desirable results. Starch in the present application is employed for its well-known qualities as a binder, tying the humate salts to the soil particles. It will be desirable to condition the surface onto which the material is deposited to make it as smooth as possible. This can be readily accomplished by preceding the application of the material by a smooth surface press wheel which leaves the surface relatively smooth and thus permits maximum utilization of the coating materials.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of accelerating germination of plants in a seed bed which comprises:
    (a) covering said seed bed with a layer of humate salts in amounts of from 0.0027 to 0.057 pound per square foot, and
    (b) aqueously fixing the humate salts to the surface soil particles.

2. In the production of agricultural crops, the method which comprises:
    (a) planting seeds as a selected depth below the surface, and
    (b) covering and aqueously fixing to the soil surface particles covering said seeds a layer of humate salts in an amount corresponding to those amounts within a range which in an aqueous solution is more than 6% and less than 15% by weight of such solution to establish a heat absorbent surface of blackened soil particles above said seeds.

3. The method according to claim 2 in which the soil surface is dyed in strips of the order of about 8 inches wide above and centered over each row of seeds.

4. In the treatment of the surface of seed beds for enhancing germination by deposit of a heat-absorbent surface layer the new use of humate salts wherein said salts are placed in an aqueous solution of pH exceeding about 6.5 in amounts of about 10–20% by weight of the total weight of the mixture and such mixture is sprayed onto the surface of said seed beds.

5. The method according to claim 4 wherein said mixture is applied in amounts of from about 0.00115 pound of said humate salts per square foot.

References Cited by the Examiner
UNITED STATES PATENTS

| | | | |
|---|---|---|---|
| 1,882,377 | 10/1932 | Whittelsey | 47—9 |
| 2,851,824 | 9/1958 | Campbell | 47—58 |
| 2,916,853 | 12/1959 | Latourette et al. | 47—58 |
| 2,927,402 | 3/1960 | Goren et al. | 47—58 |
| 3,111,404 | 11/1963 | Karcher et al. | 71—24 |

ABRAHAM G. STONE, *Primary Examiner.*

R. E. BAGWILL, *Examiner.*